June 19, 1951
C. F. TEICHMANN
2,557,158
RADIOACTIVE EXPLORATION
Filed Nov. 30, 1948
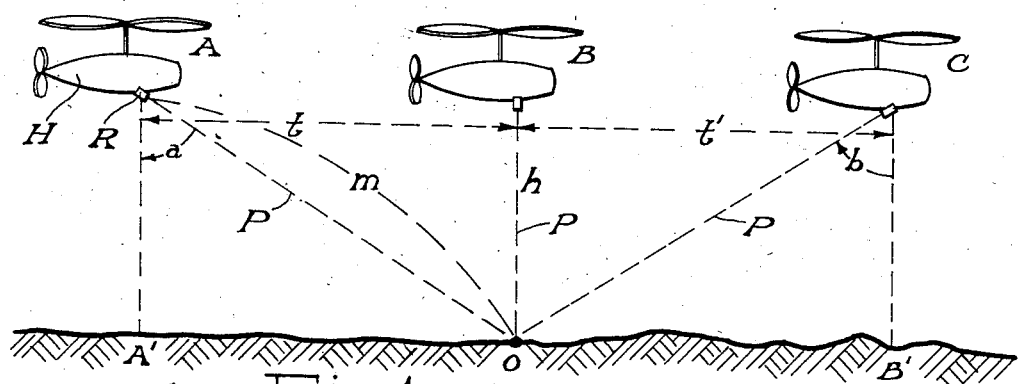
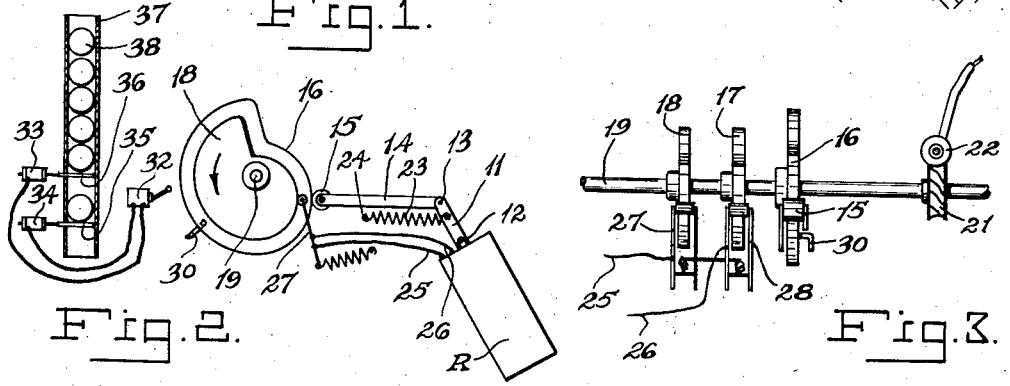
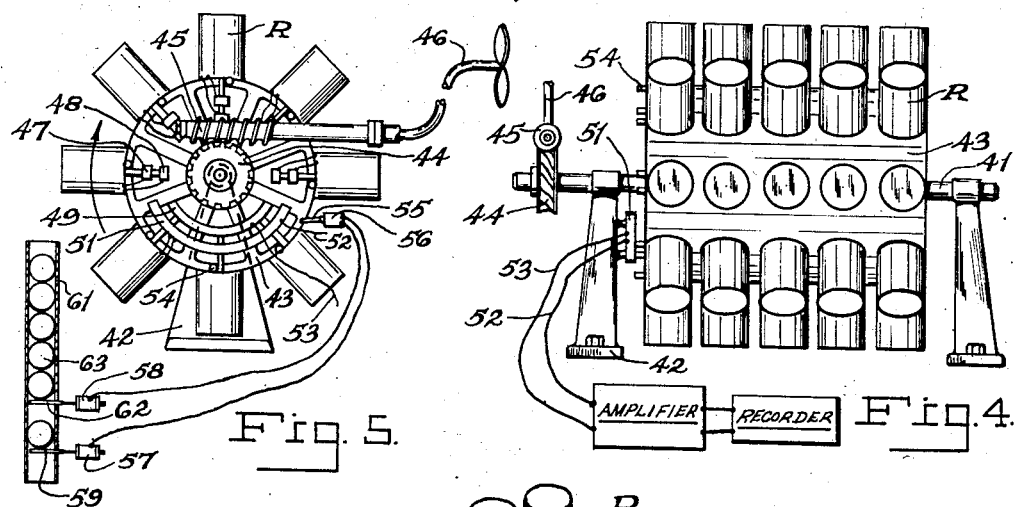
INVENTOR.
CHARLES F. TEICHMANN
BY
ATTORNEYS Patented June 19, 1951

2,557,158

UNITED STATES PATENT OFFICE 2,557,158

RADIOACTIVE EXPLORATION

Charles F. Teichmann, Mount Vernon, N. Y., assignor to Texaco Development Corporation, New York, N. Y., a corporation of Delaware Application November 30, 1948, Serial No. 62,779

10 Claims. (Cl. 250—83.6)

This invention relates to radioactive exploration such as is utilized in prospecting the earth's surface for mineral deposits.

To date a number of methods have been proposed for prospecting by the measurement of radiation such as gamma rays above or beneath the surface of the earth.

One method involves the taking of measurements on or above the earth's surface as from a moving vehicle. With this method, the detector is continuously scanning the ground, and to produce worthwhile data, it should be of an exceedingly sensitive type such as those disclosed in Patent Nos. 2,390,071 and 2,390,072.

Moreover the data is of a semi-integrated nature in that the readings are not taken at a fixed point over an appreciable time interval but at a series of fixed points, each over a very short time interval. At any one point, the time interval afforded for the reading is extremely short. While such readings are of value, it is desirable under some circumstances, as when relatively small or narrow anomalies are encountered or when relatively insensitive detectors are used, to obtain readings of a series of fixed points or sections, each reading being taken over an appreciable time interval.

One object of this invention is the provision of a novel method of radioactive exploration wherein the advantages of measurements over appreciable time intervals of a series of fixed points or sections of the area being explored are combined with the economies of a continuously moving exploration.

Another object of this invention is the provision of novel apparatus for practicing the above method.

Another object of the invention is the provision of a novel method of making radioactive surveys wherein large areas can be quickly surveyed and the results of the surveys correlated with the terrain with a high degree of accuracy.

Further objects and advantages of the invention will be apparent from the following description and claims taken in connection with the attached drawings wherein.

Fig. 1 is a diagram illustrating a method of practicing the invention;

Fig. 2 is a simplified showing in side elevation of one form of apparatus for practicing the invention;

Fig. 3 is an end elevation of the apparatus in Fig. 2;

Fig. 4 is a side elevation of a modified form of apparatus;

Fig. 5 is an end elevation of the apparatus of Fig. 4;

Fig. 6 is a modification of the apparatus shown in Figs. 4 and 5.

One feature of the present invention involves an improvement in radioactive exploration wherein the exploring means is moved substantially continuously over the area to be explored and simultaneously ranged for observation for appreciable time intervals on a series of predetermined fixed points or sections in the area. More specifically the use of a radiation detector on a moving support is contemplated, the detector being mounted for synchronous movement relative to the support whereby it can be ranged on a predetermined point or section of the area being explored and maintained on that point during movement of the support for an appreciable time interval. The support in question may be a vehicle moving over or beneath the surface of the earth or an aerial vehicle such as a helicopter moving above the earth's surface.

Another feature of the invention involves improvements in radioactive survey methods wherein measurements can be made over a large area in a relatively short time and the area marked at the same time, the markings being subsequently correlated with the area and the measurements correlated with the markings. More specifically it is contemplated that measurements, either of the continuous or intermittent type, be made of the area being surveyed and that the area be suitably marked with visible markings at the same time whereby the area with its markings can be photographed and the measurements correlated with the markings and the area. Continuous photographing of the area coincident with the radioactive surveying is also contemplated, either with or without the use of suitable markings.

Before entering into an explanation of the invention, it is advisable first to review the general characteristics of the detectors suitable for use. The principles of operation of such detectors are well known. They are made in different shapes and unless shielded are sensitive to radiation from all directions. While shielding of the detector as by suitable metal may not entirely eliminate its sensitivity to all surrounding radiation, the shielding is effective to a degree such that when it is positioned predeterminately and in an appropriate arrangement, the detector can be said to posses a principal axis of sensitivity, i. e., an axis which extends through an unshielded area or opening through which considerably more radiation can enter the detector than through the shielded areas. Thus a detector can be said to be capable of directional control, that is, the detector can be directed or ranged so that this principal axis of sensitivity is directed upon a particular area or zone that it is desired to observe. While some radiation from the surrounding area will pass through the shielding and register on the detector, the amount of this radiation is relatively small, and it can be said properly that the measurements being taken are reasonably accurate measurements of the particular area or zone under observation. Obviously with shielding of proper design, a detector of any shape can be modified to develop the desired principal axis of sensitivity.

The basic principle of the point survey feature can be explained by reference to Fig. 1 wherein three steps in the progress of an aerial survey are illustrated. If the helicopter H, selected for purposes of illustration, is flown over the area indicated and the radiation detector R is held at a fixed position with respect to the helicopter with its principal axis of sensitivity P pointed toward the earth's surface, a continuous reading from point A' to point B' will be made, the reading at each increment of distance being made in a relatively short time. In a good many instances the readings so obtained are satisfactory provided that highly efficient detectors be employed. Such detectors are disclosed in U. S. Patents Nos. 2,390,071 and 2,390,072 and are of a multiple cathode type. The cathode comprises a stack of perforated discs disposed coaxially and spaced parallel to each other with one or more anode wires running through the perforations transversed to the disc surfaces. The large cathode area per unit of an active volume thus obtained increases the efficiency for gamma rays several times without proportionally increasing the efficiency for the detector of "background." Counters of this type have a gamma ray counting efficiency of about 500% that of the conventional Geiger-Mueller counter.

In the event it is desired to use a counter of low sensitivity or it is desired to obtain reading intervals of greater time, the present invention is of advantage. To illustrate, if detector R be adjusted at position A so that its principal axis of sensitivity P is ranged on the predetermined point or section O and, during the travel of the helicopter from point A to point B, detector R is moved relative to the helicopter and in proportion to the speed of the helicopter through angle $a$ in the direction indicated, axis P of the detector will continue to range upon point O and the detector will in effect take a reading as if it were substantially fixed with reference to point O during a time of travel $t$ of the helicopter from point A to point B. During the next increment of travel of the helicopter from point B to point C during time $t'$, detector R is moved at a rate proportional to the movement of the helicopter through angle $b$ in the direction indicated, thus maintaining axis P of the detector ranged on point O.

On the helicopter reaching point C, detector R is returned to its initial position as shown at A so that its axis P is ranged on a new point or section for another measurement, the subsequent movement of the detector relative to the helicopter being synchronized as already explained.

There is some slight variation in the extent of the observed area during the observation period because of the changing angle between the principal axis of sensitivity of the detector and the plane of the ground surface. For example, if it be assumed that the observed area at O when the detector is in position B is in the shape of a circle, that circle will be elongated into an ellipse when the detector is in positions A and C. However, the error introduced thereby is substantially constant for all readings and can be disregarded. It can also be held to a minimum by reducing the distance A—C to a minimum and increasing $h$ to an amount not incompatible with good observations.

The reduction in length of axis P as the detector moves from A to B and the increase in length of the same axis as the detector moves from B to C will cause some variation in reading. However this variation will be substantially constant for all readings and can usually be disregarded. Other variations may occur when a helicopter or other aerial vehicle is used by reason of slight changes in altitude. In such cases, the readings will be from areas of slightly different extent than those originally planned.

From the above it is evident that the detector is ranged on point O for a time interval equivalent to $t+t'$ which is appreciable compared to the very short observation interval at any one point achieved by holding the detector fixed relative to the helicopter. For example, if it be assumed that the helicopter is traveling at 30 miles per hour (44 ft. per second), each of angles $a$ and $b$ be taken as 45°, and the altitude $h$ of the helicopter be taken as 150 ft., the distance from A to B or B to C is equal to $h$ or 150 ft., the total distance from A to C being 300 ft. At a speed of 44 ft. per second, $$t+t'=\frac{300}{44}$$

or 6.8 seconds. If the point or section O be assumed to be 10 ft. in length, the time of observation of a detector fixed relative to the helicopter would be $$\frac{10}{44}$$

or only 0.25 second. Thus an increase of about 2700% in the observing interval is obtained while still permitting the helicopter to travel at the same speed. Moreover, the detector is ranged on a definte point during the observing period which is not the case with a fixed detector on a moving support which is always moving relative to the points being observed.

Obviously the rate of change of position of detector R relative to the helicopter can be varied as desired so that the length of the observation period can be correspondingly varied. With conventional detectors such as the Geiger-Mueller detector having relatively low efficiencies, the time interval will necessarily be longer. With more sensitive detectors, the time interval can be shortened or better readings obtained for the same time interval.

It will be noted that by maintaining the helicopter at a relatively constant speed and synchronizing the movement of detector R therewith, various points O at predetermined distances from one another can be observed, the points being substantially the same distance apart. The distance between points O can be predetermined by varying the rate of movement of the detector or changing the speed of the helicopter. It is contemplated with detector R fixed upon a point O, that the point be marked or identified by methods hereinafter explained, so that the resultant readings can be made the basis of an accurate grid of the area being prospected, reference to specific points on the grid being thereafter made by inspection of the markings.

To facilitate identification of the marked points, it is contemplated that they be marked by markers of different colors, for instance 5 colors which may be used in the same successive order throughout the entire prospecting. Alternatively every fifth point can be marked with a marker of one color such as red, the four intervening points being marked with markers of another color such as yellow.

As hereinafter explained, it is contemplated that the markers be applied in synchronism with the observation by the detector, preferably at the beginning of each observation cycle so that the markers will be close to the points being observed.

With a ground vehicle operating as a support for the radiation detector, the marking will be very accurate and no necessity for correction will be required. With a helicopter or other aerial support, it will be necessary to determine the error introduced by the fall of the marker from the helicopter and correct therefor. Since such exploration is conducted at relatively low altitudes, the error will be small and substantially constant.

The marking from the air can be accomplished in a number of ways. Markers of solid material, darts having colored streamers thereon, or packages of colored material such as paint or powder contained in frangible wrappings or containers can be dropped. The advance position from which the marker should be dropped to designate a selected point can be determined by the following well-known formula, neglecting resistance to air, wind currents, etc.

$$D = \text{the speed of the helicopter (ft./sec.)} \times \sqrt{\frac{2h}{g}}$$

With a speed of 44 ft. per second and an altitude of 150 ft., $$D = 44 \times \sqrt{\frac{2 \times 150}{32.2}} = 134 \text{ ft.}$$

In view of the low altitude, errors due to the resistance of the air, wind, etc. are very small and can be determined by a few trial drops. A satisfactory marking at an altitude of 150 ft. usually can be accomplished by dropping the marker at position A which represents the beginning of the run, the marker following the path indicated at $m$.

While it is to be understood that the method thus far described may be practiced manually by ranging he detector by line of sight on point O and dropping the marker at position A, it is preferred to accomplish such operations automatically.

Figure 2 illustrates one means by which this can be accomplished automatically. Figure 2 is a side elevation of an assembly designed to be mounted suitably on the moving support such as a helicopter by means not shown. Detector R is secured on one end of an arm 11 pivoted about a fixed axis 12, the upper end of the arm being connected by a pin 13 to a link 14 having a cam roller 15 arranged to ride on the surface of a cam 16. Cam 16, together with smaller and similarly-shaped cams 17 and 18, is mounted on a shaft 19 to which is secured a worm gear 21. Worm gear 21 is driven by a worm 22, the latter being driven in turn by any suitable means synchronized with the speed of the helicopter. The synchronized drive may be obtained by an electrical drive connected to worm 22, the speed of which is controlled by the air speed indicator of the plane. Or a wind motor may be positioned on the helicopter and connected to worm 22 through suitable gearing. A spring 23 fixed at 24 is provided to insure the pressure of cam roller 15 against cam 16.

Leads 25 and 26 from detector R are each connected to spring pressed arms 27 and 28 having cam rollers thereon in contact with the surfaces of cams 17 and 18, the latter being electrically connected to suitable amplifying and recording means as well known in the art. The radial faces of cams 17 and 18 are insulated as with rubber or suitable plastic.

Cam 16 mounts a projecting arm 30 thereon arranged to operate a switch 32 connected to solenoids 33 and 34, arranged to operate gates 35 and 36 within a magazine 37, solenoid 33 being provided with a dashpot or equivalent delay means to effect its operation of gate 36 from a closed to open position and vice versa after the same cycle of gate 35. Magazine 37 is filled with a suitable charge of markers such as balls 38 of frangible material containing paint or powder of a color that will contrast with the color of the area being surveyed.

In operation, shaft 19 is driven at the desired synchronized speed through worm assembly 21 and 22, cams 16, 17 and 18 revolving therewith in counterclockwise direction as viewed in Fig. 2. In the position shown in Fig. 2, the radiation detector is being caused to move in a clockwise direction about pivot 12 to hold its principal axis of sensitivity on the desired point on the earth's surface. At the same time leads 25 and 26 are connected through cams 17 and 18 to the associated amplifying and recording apparatus. With continued rotation of cam 16, the radiation detector will continue to be swung in a clockwise direction until the radial surface of the cam is reached whereupon cam roller 15 will be pressed toward the left by spring 23 and radiation detector R returned to its original position in a very short period of time whereupon the observing of another fixed point or section O is initiated. It will be noted that by reason of the insulated radial faces of cams 17 and 18, the detector is disconnected from the amplifier and associated apparatus during the return movement.

In the rotation of cam 16, projection 30 is so positioned on the cam that it contacts switch 32 to release a marker 38 therein through gate 35 at substantially the same instant that radiation detector R is first fixed upon point O. Gate 35 then closes whereupon gate 36 operates to reload the chamber between the two gates.

Obviously mechanical arrangements for discharging other types of markers such as darts may be connected for synchronized operation with cam 16.

For better coverage of the area being surveyed, it is usually desired to employ more than one radiation detector whereby a number of fixed points O can be measured instead of only one series of such fixed points. This can be accomplished by the arrangement shown in Figs. 4 and 5 wherein a shaft 41 is mounted on suitable supports 42 on a vehicle to rotatably support a drum assembly 43 having a series of radiation detectors R thereon, said detectors being arranged with their principal axes of sensitivity substantially radial of the drum. A worm gear 44 and a worm 45 are suitably connected to an air motor 46 (Fig. 5) or other means for synchronized operation with the forward movement of the supporting vehicle.

The leads from each radiation detector are brought radially inward of the drum assembly and connected to contacts 47 and 48, the latter being positioned to connect with commutator segments 49 and 51 connected in turn by leads 52 and 53 to suitable amplifying and recording devices. It will be noted that except in the lower arc of drum travel as viewed in Fig. 5, the radiation detectors are disconnected from the associated amplifying and recording apparatus and are not connected therewith until each enters upon its measuring cycle. The assembly as viewed in Fig. 5 rotates in a clockwise direction with the vehicle traveling from left to right, each radiation detector becoming connected with commutator segments 49 and 51 as it enters its observing cycle. As shown in Fig. 4, any desired number of detectors may be employed in each series. With the arrangement shown, readings can be taken upon a number of different fixed points O, the readings being recorded for subsequent analysis.

While all the detectors in Fig. 4 are shown connected to a single recorder, it is to be understood that each of the detectors or each series thereof may be connected to individual amplifiers and recorders, the separate connections being made through additional commutator segments 49 and 51 or like means.

A series of lugs 54 are mounted on the drum assembly, one of such lugs being positioned adjacent the base of each series of detectors. On rotation of the drum assembly in clockwise direction as viewed in Fig. 5, the lugs contact an arm 55 connected to a switch 56 and operate solenoids 57 and 58, solenoid 58 being held in position by a delay device such as a dashpot until solenoid 57 has operated. Alternatively separate switches 56 with separate arms 55 can be provided for each solenoid, the switches being spread apart so that they are operated in sequence. Solenoid 57 is connected to a gate 59 of a magazine 61 and solenoid 58 is connected to operate a gate 62 of the same magazine. The magazine is filled with suitable marking devices 63. Thus as each detector assembly comes into detecting position and is connected to its associated amplifier and recording device through commutator segments 49 and 51, lugs 54 contact switch arm 55 to operate gates 59 and 62 in sequence and discharge a single marker on to the point or section being observed, the chamber between the two gates being reloaded.

Fig. 6 illustrates a modified arrangement of detectors wherein each series of detectors is arranged in lines non-parallel of the axis of the drum assembly. This arrangement permits readings of staggered fixed points.

The invention is particularly useful in the radioactive exploration of large areas at a relatively rapid rate. In so exploring either the continuous or the intermittent method of observation can be used. Assuming that a helicopter is used, the latter is moved over the area on a series of flights substantially parallel to one another and spaced approximately the same distance apart. Readings are taken and recorded during the flights. If the readings be of the continuous type, markers are dropped at regular intervals, the positions of each marker being identified with respect to the readings being taken. If the readings are recorded on a continuous tape as is the usual procedure, the recording device can be given an added pulse, by suitable electrical or mechanical means when each marker is dropped. When the intermittent observation method is used, the markers may be dropped at the beginning of each observation cycle as previously explained. In either case, each marking is correlated with a reading.

On completion of the survey after all readings have been taken and all the markers applied, the area may be photographed. By reason of the markers being visible on the aerial map thus made, the markers can be correlated immediately with the ground and the readings correlated with the markers. Thus a complete and accurate radioactive survey of the entire area can be quickly made. Obviously the map can be further refined by other modifications such as the drafting of isoradins thereon.

As alternative methods of recording the survey, the area being surveyed may be photographed continuously with a suitable recording camera mounted on the moving support or a recording camera, preferably with a telescopic lens, may be mounted in conjunction with the detector or detectors to move therewith so that the optical axis of the camera is substantially coincident with the principal axis of sensitivity of the detector assembly. The camera may be synchronized for operation when the detector assembly is at position B (Fig. 1) whereby a photographic record of the observed zone can be made simultaneous with the survey. In such case an annular type counter would be preferred, the annulus being fitted with a telescopic lens of a recording camera. Such a combination enables the making of a master log of radioactivity and a picture of the terrain at the same time.

Obviously many modifications and variations of the invention as above set forth may be made without departing from the spirit and scope thereof, and therefore only such limitations should be imposed as are indicated in the appended claims.

I claim:

1. A method of determining the radiation over an appreciable period of time from a predetermined section of an area being explored by a radiation detector mounted on a support moving relative to said section comprising the steps of directing said radiation detector on said section, maintaining said radiation detector directed on said section by movement of the principal axis of sensitivity of said radiation detector relative to said moving support, rendering said detector inoperative after a predetermined time of observation, returning said detector to its original position on said support for observation of a second section of the area, and rendering said detector operative for observation of said second section.

2. A method of determining the radiation over an appreciable period of time from a predetermined section of an area being explored by a radiation detector mounted on a support moving relative to said section comprising the steps of directing said radiation detector on said section, maintaining said detector so directed by movement of the principal axis of sensitivity of said detector relative to said moving support, and identifying the section so observed for subsequent correlation with the observed radiation.

3. A relatively rapid method of prospecting a relatively large area for mineral and other earth deposits comprising the steps of measuring the radioactivity of each of a series of spaced points on the area being explored, recording the measurements, marking the points so measured, correlating the marked points with the area being explored, and correlating the measurements with the points to determine anomalies in the area.

4. A method of rapidly prospecting a relatively large area for mineral and other earth deposits by substantially continuous movement thereover at a relatively high speed comprising the steps of measuring the radio-activity of a series of spaced points in the path of movement, recording the measurements, marking the points so measured, recording the points so marked on a representation of the area, and correlating the measurements with the points to determine anomalies in the area.

5. An improvement in prospecting apparatus for measuring radiation in an area to be prospected wherein a radiation detector support mounting a radiation detector is arranged to be substantially continuously moved over said area during the prospecting comprising means to pivotally mount said detector on said support, and means to swing the detector about the pivot in a direction opposite to the movement of the support and at a rate so proportioned to the speed of the support as to enable the detector to be maintained in detecting position with respect to a predetermined and fixed section of the area being prospected for an appreciable time interval and returning the detector to its initial position at the end of said time interval for observation of a second predetermined section, amplifying means for use with said detector, and means to maintain said detector connected to said amplifying means during its observing movement and to disconnect said detector from said amplifying means during its return movement.

6. An improvement in prospecting apparatus for measuring radiation in an area to be prospected wherein a radiation detector support mounting a radiation detector is arranged to be substantially continuously moved over said area during the prospecting, comprising a detector assembly including a plurality of detectors substantially radially disposed about an axis intended to be positioned generally parallel to the surface of the earth during prospecting, and means to revolve said detectors about said axis during the prospecting and at a rate such that during their exposure to the earth's surface, each is directed onto a fixed point on said surface for an appreciable interval of time.

7. The apparatus of claim 6 wherein said detectors are arranged in lines substantially parallel to said axis.

8. The apparatus of claim 6 wherein said detectors are arranged in lines non-parallel to said axis.

9. The apparatus of claim 6 including amplifiers and means to effect the connection of each detector and said amplifiers when said detector is in observing position relative to the surface of the earth and to disconnect said detector when not in said observing position.

10. The apparatus of claim 6 wherein means is provided in synchronism with said detectors to identify the fixed sections being observed.

CHARLES F. TEICHMANN.

REFERENCES CITED

The following references are of record in the file of this patent:

UNITED STATES PATENTS

| Number | Name | Date |
|---|---|---|
| 2,412,165 | McDermott | Dec. 3, 1946 |

OTHER REFERENCES

Ridland, Transactions of AIMME, vol. 164, Geophysics 1945, pp. 117–124.

Mining and Metallurgy, Sept. 1946, p. 474.